March 2, 1954

C. G. HOCKETT 2,670,576

GROMMET MAKING MACHINE

Filed Dec. 29, 1950

INVENTOR.
Carl G. Hockett
BY
Barlow & Barlow
Attorneys

March 2, 1954  C. G. HOCKETT  2,670,576
GROMMET MAKING MACHINE
Filed Dec. 29, 1950  10 Sheets-Sheet 2

Fig. 2.

INVENTOR.
Carl G. Hockett
BY
Barlow & Barlow
Attorneys

March 2, 1954

C. G. HOCKETT 2,670,576

GROMMET MAKING MACHINE

Filed Dec. 29, 1950

INVENTOR.
Carl G. Hockett
BY
Barlow & Barlow
Attorneys

March 2, 1954

C. G. HOCKETT 2,670,576

GROMMET MAKING MACHINE

Filed Dec. 29, 1950

INVENTOR.
Carl G. Hockett
BY
Barlow & Barlow
Attorneys

March 2, 1954  C. G. HOCKETT  2,670,576
GROMMET MAKING MACHINE
Filed Dec. 29, 1950  10 Sheets-Sheet 6

INVENTOR.
Carl G. Hockett
BY
Barlow & Barlow
Attorneys

March 2, 1954 C. G. HOCKETT 2,670,576
GROMMET MAKING MACHINE
Filed Dec. 29, 1950 10 Sheets-Sheet 7

INVENTOR.
Carl G. Hockett
BY
Barlow & Barlow
Attorneys

March 2, 1954 C. G. HOCKETT 2,670,576
GROMMET MAKING MACHINE
Filed Dec. 29, 1950 10 Sheets-Sheet 8

INVENTOR.
Carl G. Hockett
BY
Barlow & Barlow
Attorneys

Patented Mar. 2, 1954

2,670,576

UNITED STATES PATENT OFFICE 2,670,576

GROMMET MAKING MACHINE

Carl G. Hockett, Uxbridge, Mass., assignor to Fram Corporation, a corporation of Rhode Island Application December 29, 1950, Serial No. 203,389

6 Claims. (Cl. 51—108)

This invention relates to a machine for forming grommets mechanically from tubular stock.

Heretofore, grommets made of some rubber or synthetic rubber-like material or other plastic forms have been made by molding. Molding provides a grommet which cannot be held to close tolerances and usually provides a grommet having some sort of a rib formed along the cleavage line of the molds, which must be later removed by some mechanical means which proves expensive.

One of the objects of this invention is to provide a grommet from tubular stock mechanically by tool operations.

Another object of the invention is to provide a machine which will operate upon a resilient stock to provide the grommets in multiple.

Another object of the invention is to provide for the cutting of a multiplicity of grommets at one time from resilient tubular stock without breaking the abrasive disk type cutting tools.

Another object of the invention is to provide a machine which will be in continuous operation so that the tubes from which the grommets are formed may be loaded into a magazine and the grommets may be collected in a basket or receptacle at some other location, it being unnecessary for manual operation of the machine except for supply of the stock to be operated upon.

Another object of the invention is to provide a slow motion adjacent stopping and starting of the stock where it is operated upon by the tools with a rapid advance therebetween.

Another object of the invention is to provide controls so that should any of the parts become inoperative or out of place, the machine will stop.

With these and other objects in view, the invention relates to certain novel features of construction, as will be more fully described and particularly pointed out in the appended claims.

In the accompanying drawings:

Fig. 18 is a perspective view of one disc of the cutting off tool;

Fig. 19 is a perspective view of a spacer between such cutting off tools;

Fig. 23 is a diagrammatic view of the electrical control of the machine.

In proceeding with this invention, I provide a turret for spindles which revolves these spindles about the axis of the turret and I also rotate each of the spindles in the turret during the operation of the tools on the work supported on the spindles. The turret as it turns moves the work on the spindles first into engagement with a gang tool which grooves the tubular work and then in further revolving moves the work into engagement with a gang tool which cuts through the tubular work intermediate adjacent grooves which have been formed so as to provide individual grommets which are in co-axial tandem relation on the spindles. The work is placed in magazines and fed to a position so that the tube may be forced onto one of the spindles at a given location where it is not rotating and at the same time the work which has been fed onto the next spindle is ironed in some instances so as to cause it to be of a uniform thickness throughout its length. Also at this same time, work which has previously been grooved and cut is stripped off the spindle and caught in a suitable receiving container. This loading, ironing and stripping operation takes place while the turret moves slowly and the operation is performed by motors on a platform which moves with the work. The motion of the turret is such that after the loading, ironing and stripping operation is performed upon three different spindles at substantially one time, it then speeds up in its movement that no time will be lost during positioning of additional spindles for a similar operation. The motors for forcing the work on the spindles are air motors, allowing certain flexibility while the controls for these motors are electrical.

With reference to the drawings, the framework 25 (Fig. 1) has a base portion 26, uprights 27 and a table or deck 28, while it is provided with stringers 29 for supporting certain of the driving parts of the machine. The standard 30 extends upwardly from the deck 28 and supports a bearing 31 for a shaft 32 upon which the turret designated generally 33 is mounted. This turret comprises a pair of discs 34 and 35 providing a plurality of bearings 36 and 37 in which shafts 38 are rotatably mounted for rotating spindles secured to their ends. The shafts are mounted circularly about the axis of the shaft 32 and are each provided with a sprocket gear 39 which is engaged by a sprocket chain 40 (see Fig. 3) for rotating the spindles during a part of the revolving movement of the turret.

Figure 3:
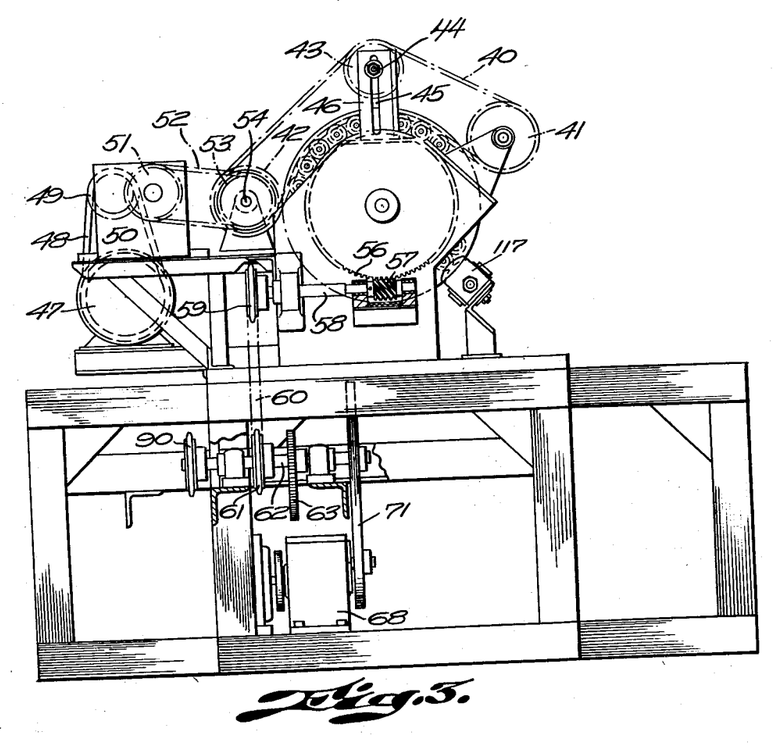
Fig. 3 is an end view of the machine looking from the left hand end of Fig. 1.

The chain 40 is trained over pulleys 41 and 42 and the movable pulley 43 for effecting an adjustment by means of its spindle axis 44 being mounted for movement in the slot 45 of the bracket 46. A drive is provided for the chain 40 from electric motor 47 through belt 48, pulley 49, reduction gears 50, pulley 51 and belt 52 to pulley 53 on shaft 54 which drives pulley 42. It will be apparent that as the spindles pass the upper third of their revolution they will be driven by the sprocket chain thus provided but will not be so driven during the remainder of their travel.

The turret is driven by rotation of the shaft 32 which has mounted thereon a worm wheel 56 to be turned by a worm 57. This worm is mounted on shaft 58, which is driven by sprocket gear 59 through chain 60 from gear 61 on shaft 62, which is driven from one of the epicycloid gears 63 (see also Fig. 1), which meshes with the other epicycloid gear 64 on shaft 65 which shaft is driven from electric motor 66 (see Fig. 1) through a belt 67, reduction gear box 68, shaft 69, pulley 70, belt 71, and pulley 73, from which it will be apparent that the motion given to the worm 57 will be at varying speeds dependent upon the position of the epicycloid gears.

Figures 1, 1A:
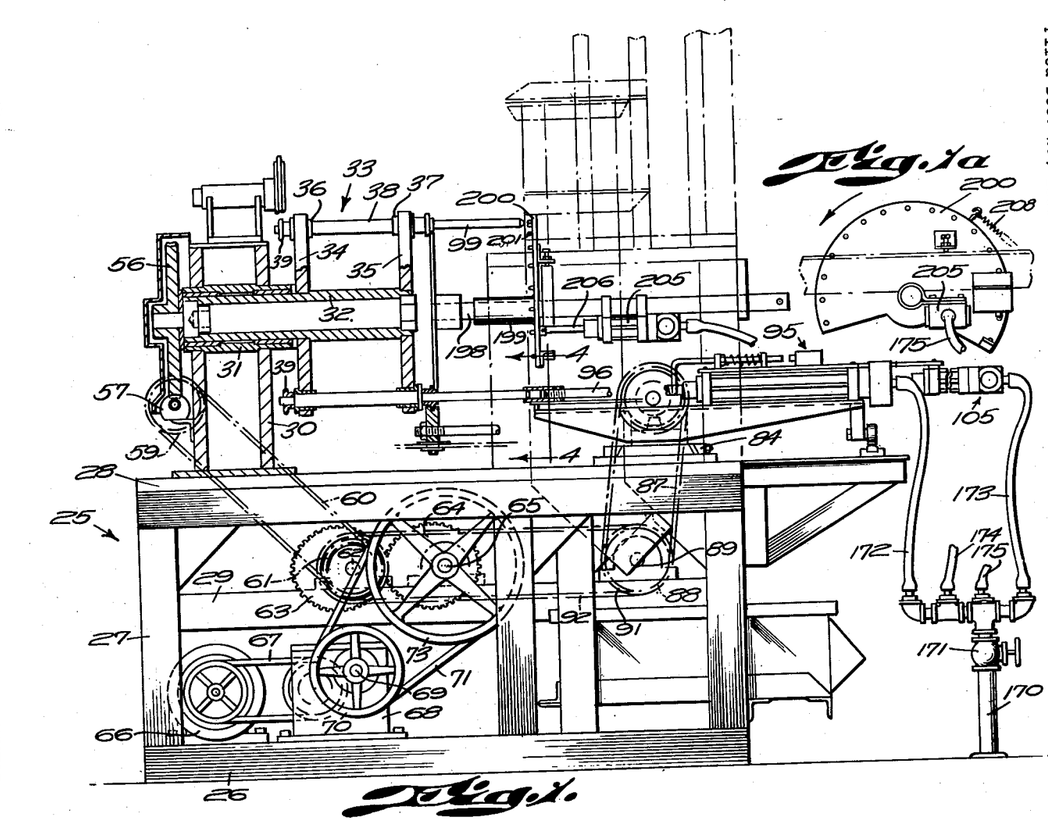
Fig. 1 is an elevation with certain parts of the machine in section and with the mounting for the operating tools illustrated in dotted lines.
Fig. 1a is an end view of the spindle support.
Figure 2:
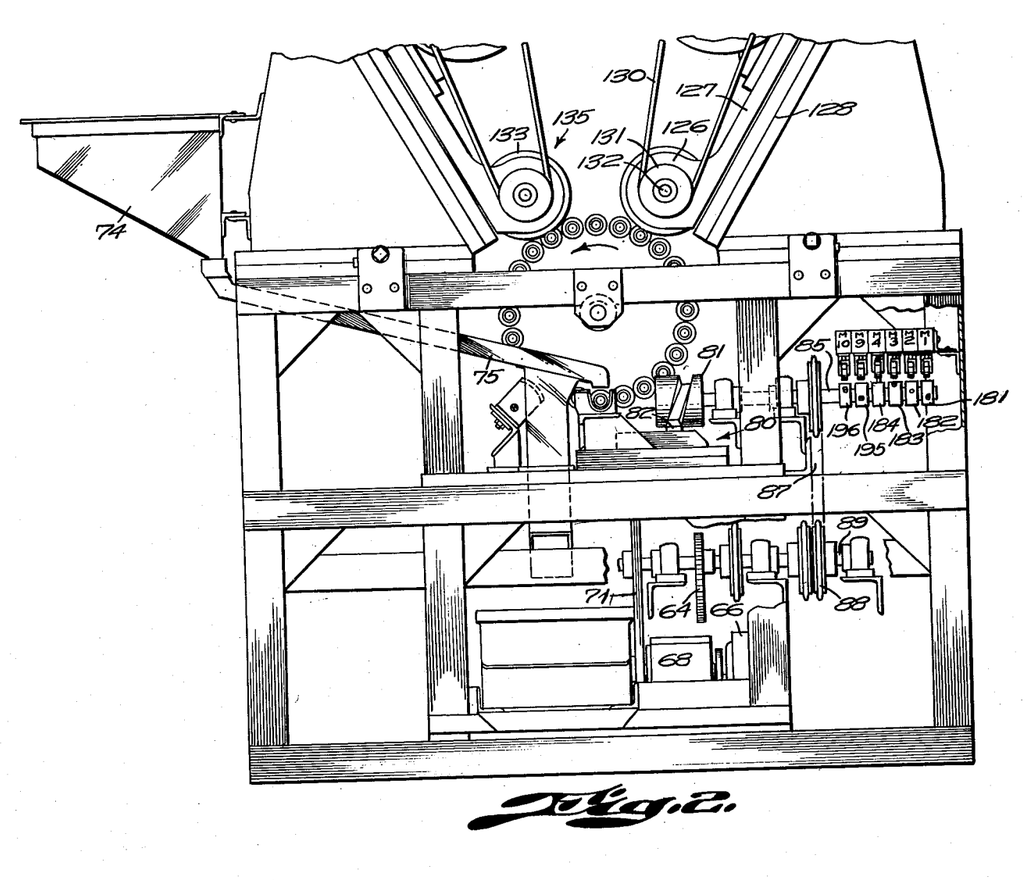
Fig. 2 is an end view of the machine looking from the right hand end of Fig. 1 with the operating tools in place.
Figure 12:
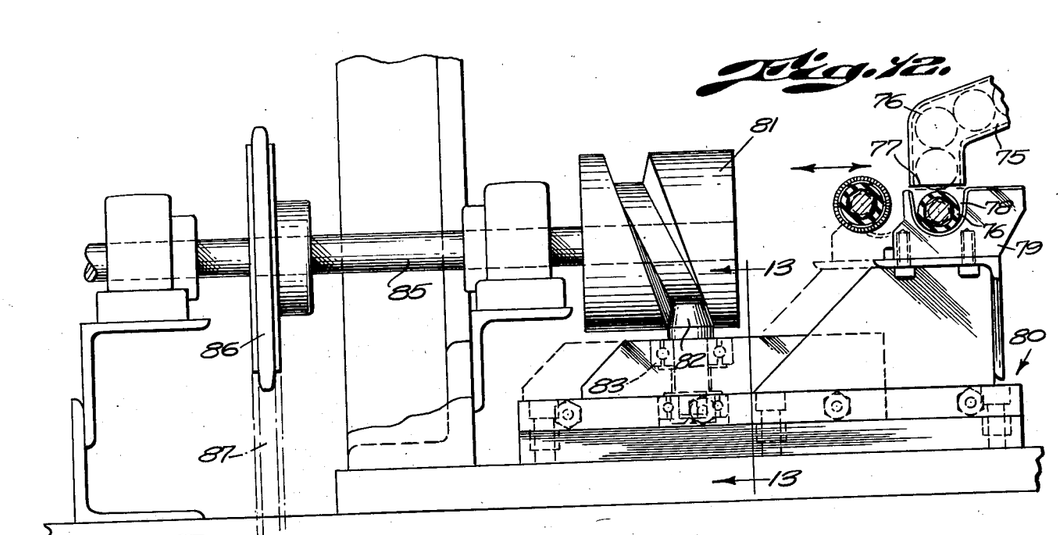
Fig. 12 is a sectional view on substantially line 12—12 of Fig. 5 showing two spindles of the turret, part of the magazine, the carriage for operating the magazine control, and a part of the machine for operating the carriage.
Figure 13:
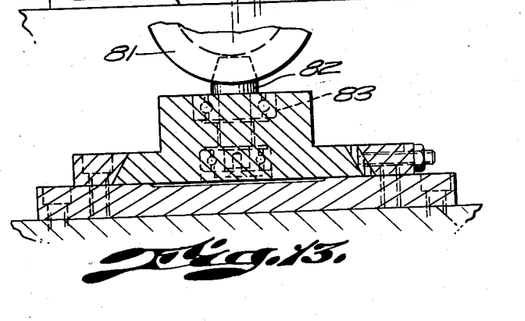
Fig. 13 is a section on line 13—13 of Fig. 12.

Referring particularly to Fig. 2, a hopper 74 is provided with chute 75 for feeding a piece of tubular material 76 (Fig. 12) downwardly to be discharged from its end 77. A trough 78 is formed in the member 79 for the reception of a piece of work which in this position is so located that it may be forced onto one of the spindles when the spindle is in its lowermost position as shown in Fig. 2. This member 79 is mounted upon a reciprocating carriage 80 which may slide to the left and right as shown in Fig. 12 and is actuated by cam 81 and follower 82 which is rotatably mounted in ball bearings 83 (Fig. 13) secured to the carriage. As this cam rotates, this carriage will be moved back and forth from left to right as shown in Fig. 12. The dovetail guideway for this carriage is shown in Fig. 1 at 84. A roll 84' supports the outboard end of this carriage to prevent jamming in the guideway 84. The cam 81 is mounted on the end of shaft 85 which has a sprocket 86 driven by sprocket chain 87 (Fig. 2) from sprocket 88 mounted on shaft 89, which shaft is driven from the shaft 62 by means of sprocket gear 90 (Fig. 3) on shaft 62 and sprocket gear 91 (Fig. 1) on shaft 89 by means of sprocket chain 92. Thus, the slow and fast motion caused by the epicycloid gears 63 and 64 is transmitted to this cam so that a timed relationship exists and the carriage will be moved at substantially the speed of the turret during its slow movement while operation of the loading mechanism occurs.

Figures 4, 5, 6, 7:
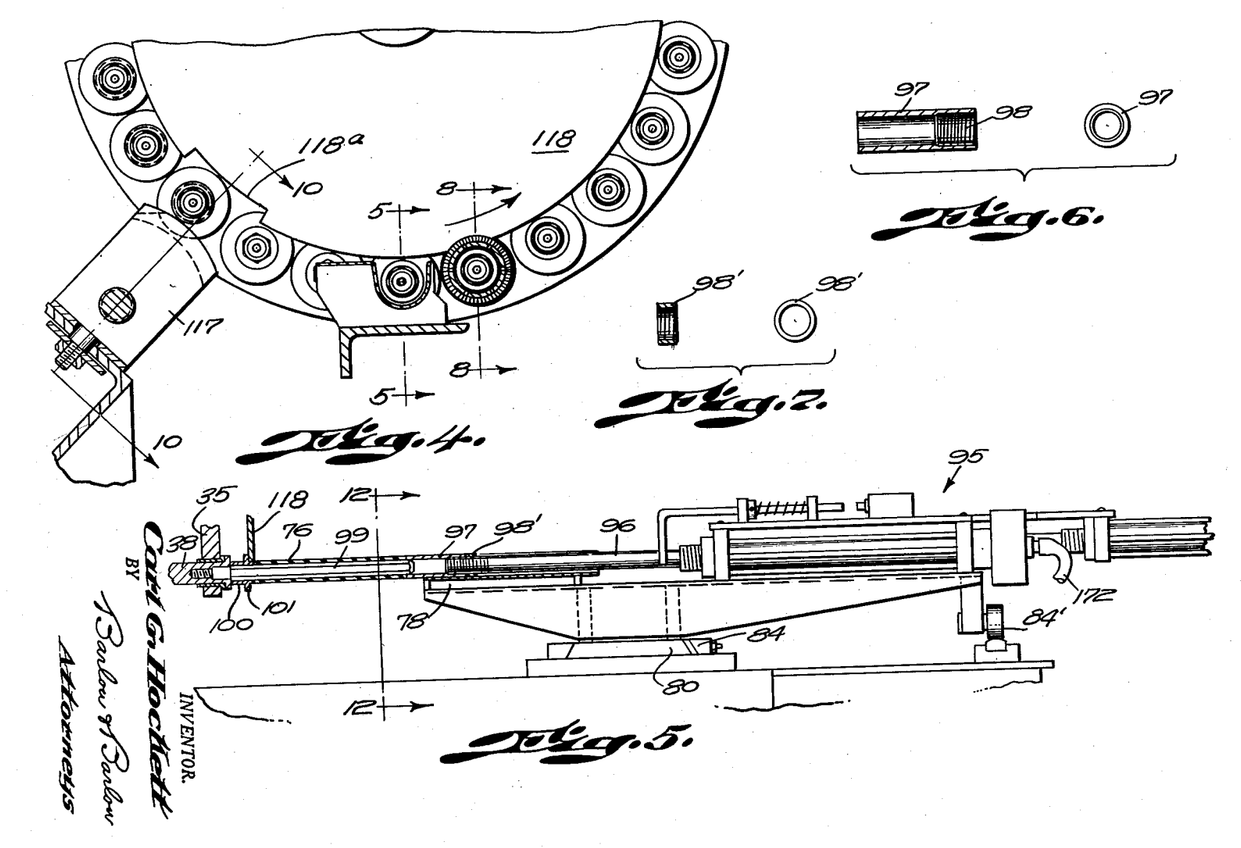
Fig. 4 is a sectional view on line 4—4 of Fig. 1.
Fig. 5 is a sectional view on line 5—5 of Fig. 4 showing the air motor for the positioning of a piece of tubular stock onto one of the spindles.
Fig. 6 is a section view and end view of the tip for engaging the stock and forcing it on a spindle.
Fig. 7 is a sectional and end view of the locking nut for the stock pushers.

The carriage 89 has mounted upon it such air motors as operate during loading. The air motors are individually shown in separate views. The air motor designated generally 95 is shown in Fig. 5 and is provided with a rod 96 which has the presser 97 (see also Fig. 6) secured at one end by means of threads 98 and locked in position by lock nut 98' (Fig. 7). This rod and presser will move through the trough 78 to engage the work 76 which is located therein and will force it onto one of the spindles 99 which projects from and is threaded onto the end of the spindle shaft 38, previously referred to. This presser 97 will force the resilient tube 76 along the hexagonal spindle 99 up against the ejecting slide 100, flanged as at 101. The carriage 80 is moved at the same speed as spindle 99 by cam 81 while the movement of the presser tool operates under the action of the air motor so there is no relative movement between them.

Figure 8:
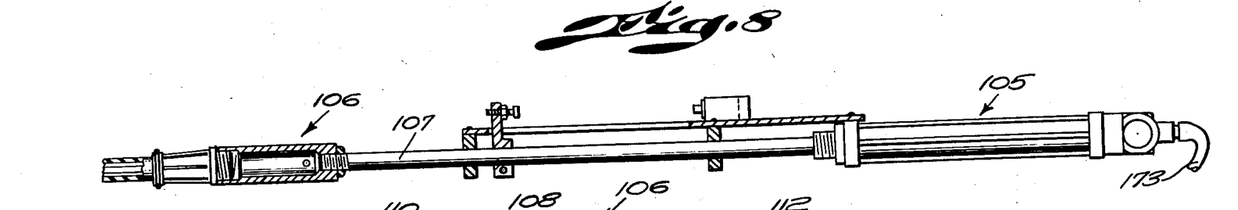
Fig. 8 is a view similar to Fig. 5 illustrating the smoothing or ironing tool and air motor therefor.
Figures 9, 10, 11:
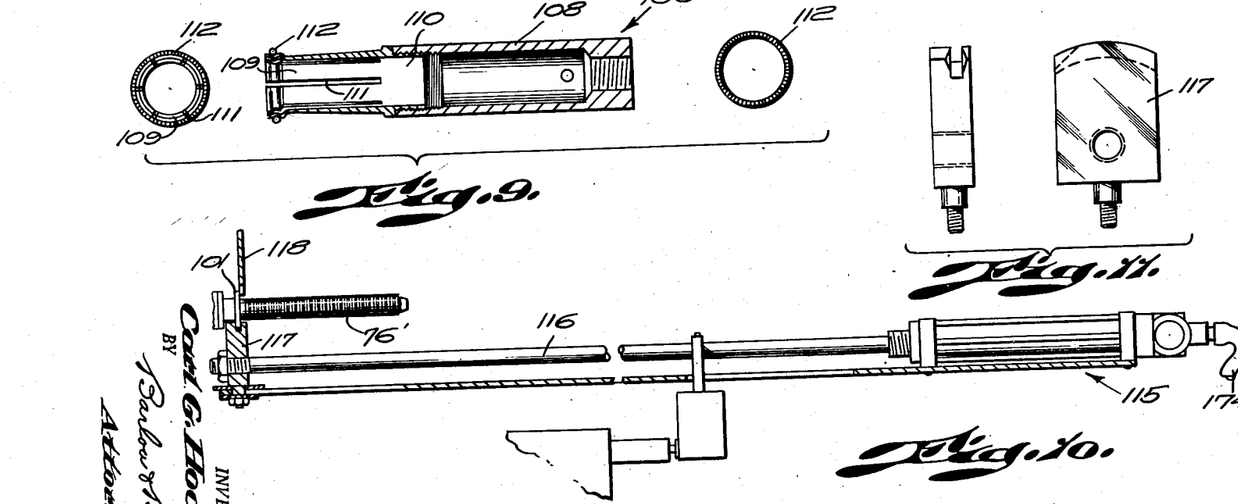
Fig. 9 is a sectional view and end view and detail end view of the contracting spring alone of the ironing tool.
Fig. 10 is a sectional view similar to Figs. 5 and 8 of the air motor for the stripping means.
Fig. 11 shows edge and end views of the stripping member.

Another air motor designated generally 105 (see Fig. 8) is provided with an ironing tool 106 at the end of its rod 107 which is shown in greater detail in Fig. 9 as comprising a tube 108 with six fingers 109 formed by slitting the tube 110. These fingers are separated by slots 111 and are drawn together by a coil spring 112. The action of this tool is to slide over the tube positioned on the spindle in the previous station so as to iron the tube out and cause the same to have a substantially uniform diameter on its spindle. This also is a very quick motion and occurs as the turret and carriage 80 move together or are without relative motion.

A third motor designated generally 115 and shown in Fig. 10 has a rod 116 which carries at its end a device 117 for engaging the flange 101 of the stripper which is held in place during most of its revolution by flange 118 fixed to the axis of the turret but which is free from this flange at notch 118a in the position shown in Fig. 4 so that during the instant the turret is so located when this motor 115 acts to the right as shown in Fig. 10, the tube 76' now having been cut will be ejected and the separated grommets thereon will be collected in some container.

A grooving cutter which may be designated generally 125 (Figs. 14 and 15) is mounted on a bearing 126 carried on a base 127 which is slidably mounted at 128 and which also has mounted on this base a motor 129 with a belt 130 driving pulley 131 which drives the shaft 132 upon which the tool 125 is located. This tool 125 comprises a plurality of abrasive discs as shown at 133 (see Fig. 18) and which are spaced a certain distance apart by metal washers 134 the whole assembly being upon a shaft in the bearing 126. This tool 125 is so positioned that as the tubes 76 on the spindles pass beneath it, circular grooves will be ground in the tube by each of the discs. See groove 160, Fig. 22. The discs may be a steel cutter instead of abrasive material.

Figure 14:
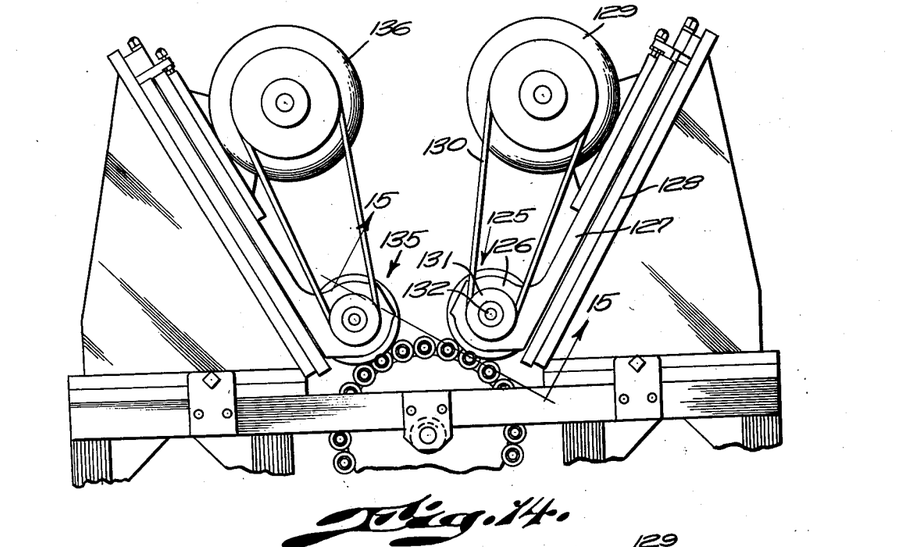
Fig. 14 is an end view supplementing the showing in Fig. 2 to show the mounting of the grooving and cutting off tools and the motors for driving them.
Figures 15, 16, 17:
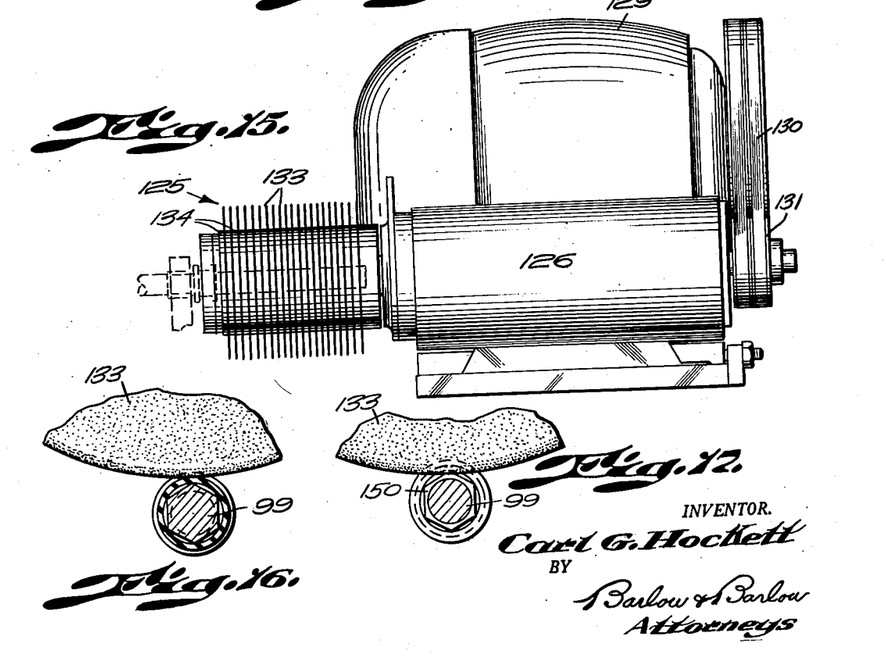
Fig. 15 is an end view on line 15—15 of Fig. 14 showing the gang of grooving tools.
Fig. 16 is a sectional view showing the spindle with a piece of work thereon and the relative position of the grooving tools which operate on the work in this position.
Fig. 17 is a view similar to Fig. 16 but showing the spindle and work thereon with the relative position of the cutting off tool.
Figures 20, 21, 22, 24:
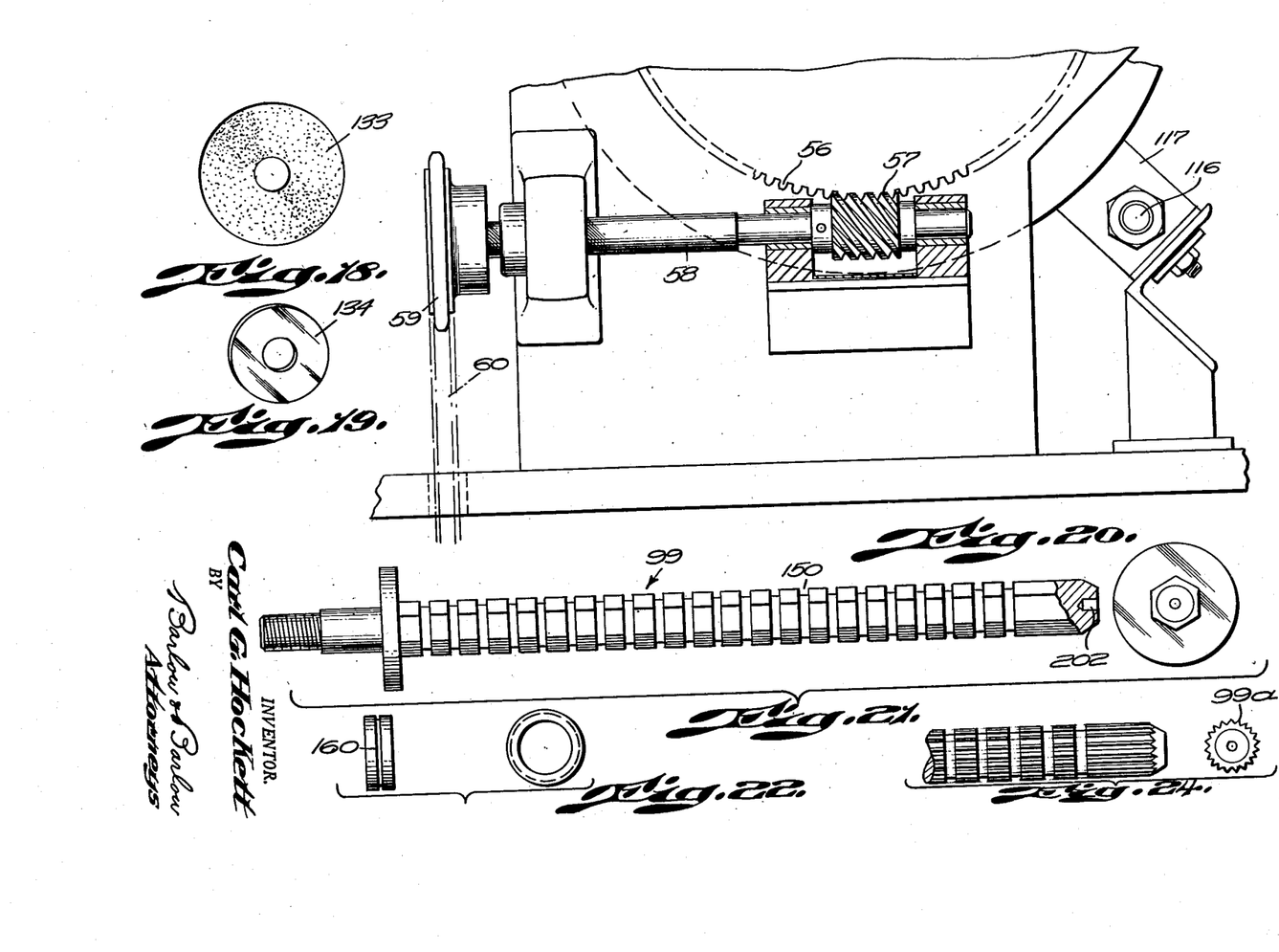
Fig. 20 is an end view illustrating the drive for the spindle turret.
Fig. 21 is an elevation and end view of one of the spindles.
Fig. 22 is an elevation and end view of the grommet formed by the machine.
Fig. 24 is a fragmental elevation and end view of a modified form of spindle.

A similar tool 135 is provided driven by motor 136 all of which is similarly mounted at a different location as shown in Fig. 14. The tool 135 has its disc set further into the path of movement of the work on the spindles than the tool 125 and each disc is opposite a groove 150 in the spindle 99 as shown in Fig. 21. As the turret rotates as shown in Fig. 14, the tube 76 will first pass beneath the grooving tool 125 where a groove such as shown at 160 (see Fig. 22) will be placed in the tube at a plurality of locations corresponding with the location and number of the cutters 133. The spindles will at this point all be rotating as driven by the chain. The grooved tube will then advance to a position beneath the tool 135 and there the tool will cut through the tube half way between the grooves into the spaces 150 (see also Fig. 17) and thus sever the tube into a plurality of different parts or complete the formation of the grommet. I have found that by providing a gang of cutting-off cutters separate from the gang of grooving cutters that I may operate this machine at greater speed. Further, there is less likelihood of vibration while grinding occurs as there would be no cutting off at this same time. Any vibration I have found will break the thin abrasive disks that are used in these tools and by the use of these two separate gangs of tools, there is less likelihood of the tools breaking. Further, by use of separate tools, the work is better held on the spindle, and it is desirable that the work does not rotate on the spindle while the cutting or grooving occurs.

The further advance of the turret will cause the tube so cut to advance to the stripping position shown at 117 in Fig. 4, and the stripping action above referred to will take place to strip the grommets from the spindle when positioned at this location at the same time that loading and ironing occur on other spindles, that is, during the slower movement of the turret. The turret between these operations will move faster due to the epicycloid gears.

A supporting plate 200 is pivotally mounted on shaft 198 by sleeve 199 adjacent the free end of the spindles 99 and may be moved axially of the shaft 198 to cause pins 201 to enter the holes 202 (Fig. 21) in the end of the spindles 99. This plate will then rotate a part of a revolution on its pivot with the turret and support the turret while the grooving and cutting off tools are operating upon the work.

It will be understood that the air pressure is continuously supplied from a source 170 (Fig. 1) through main control valve 171 to the branch lines 172, 173, 174, 175, to the push on motor 95, the stretcher motor 105, to the stripper motor 115, and to the supporting plate motor 205, each of which motors contains two solenoid relays, one for opening a valve to cause the air to force the piston in one direction and the other to control a valve to force the piston in the opposite direction.

Different parts of the machine are controlled electrically from the cam shaft 85 by cams 181, 182, 183 and 184, 195, 196, which cams close switches which are shown in Fig. 23 and are designated M1, M2, M3, M4, M9 and M10, corresponding respectively to the cams 181, 182, 183, 184, 195, 196.

The electrical circuit which is provided for this machine is diagrammatically shown in Fig. 23. At the upper part of this figure, there is designated the wiring for the two motors 129 and 136, which are three phase 3 H. P., 220 volt motors, and when started by their push button start switches remain in operation continuously until stopped by the push button stop switch. The wiring diagram is conventional for each of these motors. Also, there is shown a wiring diagram for the operation of the spindle rotating motor 47, which is a three phase, ½ H. P., 220 volt motor and when this motor is started, it remains in continuous operation until it is stopped by a push button switch. The wiring of this motor is also conventional. The supply for all of the motors is from a source designated 185.

The remainder of the diagram shown in Fig. 23 is the wiring for the automatic control of the machine with one side of the circuit being grounded and a single wire showing the other side of the circuit. The motor 66 is 110 volt, ¼ H. P. motor taken directly from the lead in lines D and A as shown in the panel 185 at the upper center of the Fig. 23. This motor is stopped and started at intervals during each cycle of the machine and is stopped while the air motors 95, 105, and 115 operate. Stopping and starting, however, is almost instantaneous, as in the actuation of these air motors.

The cycle of operation is as follows:

The cam 182 closes the switch M2 which actuates the advancing relay in the motor 95 to open a valve, letting in air to force the plunger of the motor forwardly and to the left as shown in Fig. 23 so as to force one of the rubber tubes onto the spindle 99 and at the same time similarly actuates the plunger in the stretcher tube motor to cause a movement of its plunger to the left as shown in Fig. 23. The cam 181 next closes the switch M1, which energizes relay 186 which in turn opens a contact 187 in series with the starting coil of motor 66 to cause the motor to run slower. The motor runs slower just before the rubber tube is forced onto the spindle so that at the time that the tube is forced onto the spindle, the turret is moving slowly. The cam 183 next closes the switch M3, which energizes the relays in motors 95 and 105 to open a valve for admitting air to the left hand end of the cylinders as shown in Fig. 23, to cause the plungers to return to their starting position. At substantially the same time, the cam 184 closes switch M4 to actuate a relay in the stripper motor 115 causing it to open a valve to cause the plunger in the stripper motor to move to the right as shown in Fig. 23 and strip the grommets which have been grooved and cut and thus completed from the spindle which arrives at this location. At the end of the stripping stroke, arm 188 on the stripper plunger engages the switch M5 which closes to energize a relay in the stripper motor 115 to cause a valve to admit air to move the stripper plunger to the left as shown in Fig. 23, returning it to its normal position. The movement of the plunger to its normal position strikes a spring tensioned plunger 189, forcing it against the action of spring 190 to momentarily strike switch M8. This switch is in series with switches M6 and M7, which are closed when the stretcher motor plunger and push on motor plunger are at the right hand end of their stroke by reason of the engagement by arms 191 and 192 so that if these motors are in their normal position to the right and the switches are closed, the closing of the switch M8 will energize the relay 193 to start the motor 66 for continuing the operation of the machine.

At the proper moment, cam 195 will cause the switch M9 to close the circuit to energize the relay in motor 205 to operate the valve to force its plunger 206 to the left to move the plate 200 into engagement with the spindles and after the travel of the plate through a certain arc during the cutting and grooving operation of work on the spindles, the switch M10 will close to energize the relay in motor 205 to force the plunger 206 in the opposite direction and withdraw the pins of the plate from the ends of the spindles, whereupon spring 208 will return this plate to its starting position, ready for another operation. This will occur during one of the cycles caused by one complete revolution of the cam shaft 85.

In some cases, instead of the spindle 99 being hexagonal in cross sectional shape, it may have a serrated surface as shown at 99a in Fig. 24.

Figure 25:
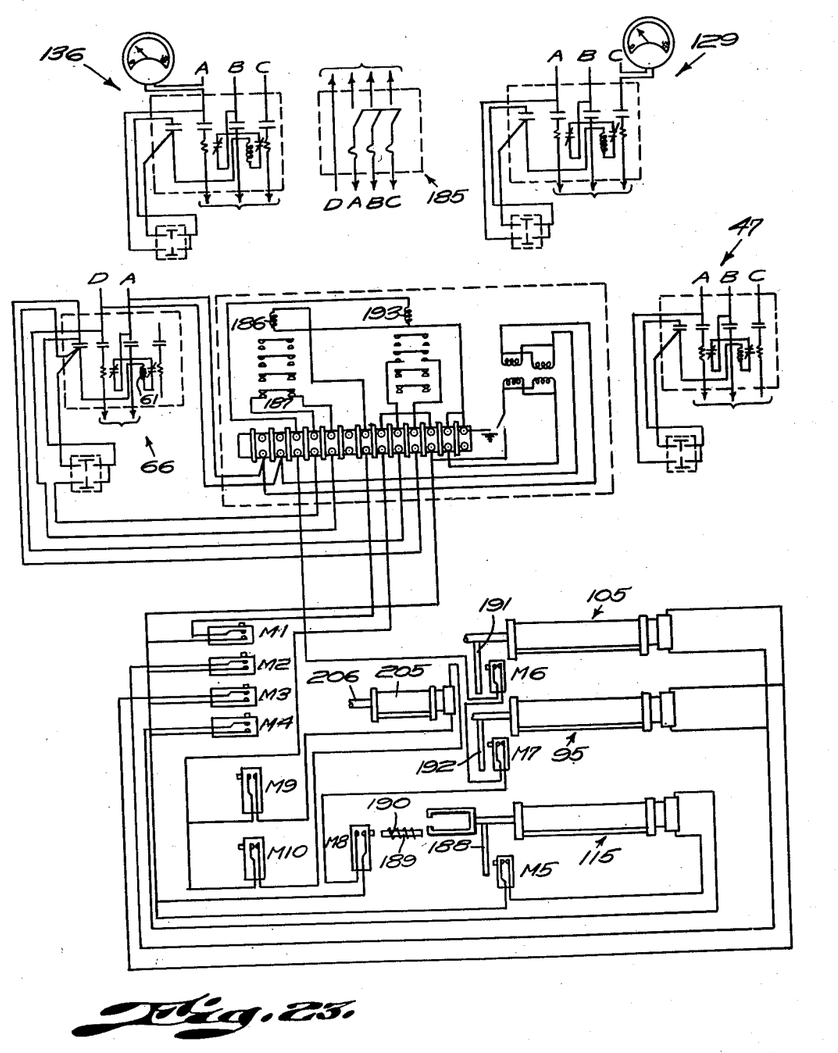
Fig. 25 is an elevation partly broken away of an air motor with a modified form of pusher rod.
Figure 26:
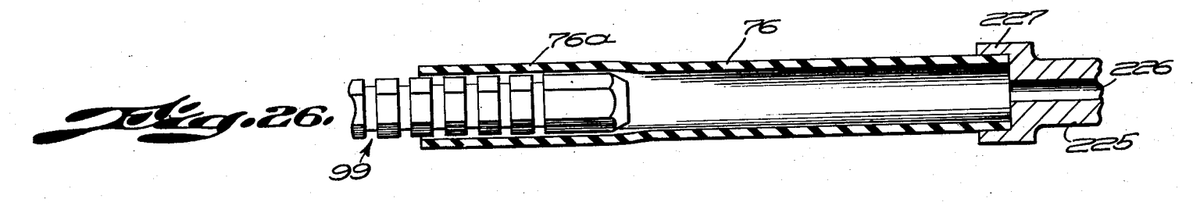
Fig. 26 is a section view of the spindle tubular stock and end of the modified form of pusher rod of Fig. 25.

In some cases the rubber tube 76 will be expended as it is forced onto the spindle 99 and in order to accomplish this, the pusher 225 (Fig. 25) is provided with a central hole 226 and a cup end 227 which will snugly fit the tube 76. Thus compressed air is blown into the tube 76 to expand it as at 76a and be forced onto the spindle 99 without being axially compressed. Thus there is not the need of ironing the outer surface as shown in Fig. 8.

Figure 27:
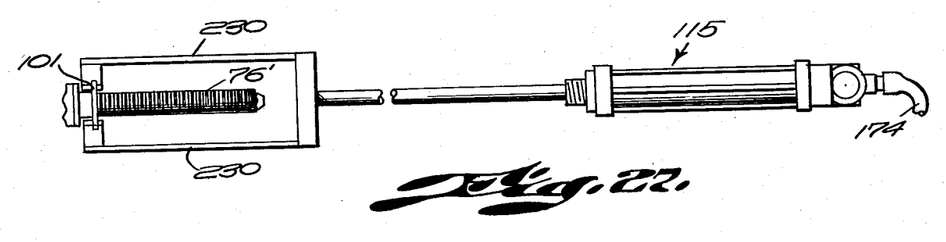
Fig. 27 is a plan view of an air motor and modified form of stripper member.

In Fig. 27, the rod 116 has a pair of arms 230 instead of the device 117 to engage the flange 101 of the stripper.

I claim:

1. In a machine for making grommets, a gang tool for providing a plurality of recesses in the work, a second gang tool for severing the work in a plurality of locations, a spindle for receiving thereon and supporting the work in the form of tubular stock, means for rotating the spindle and means for supporting the spindle at one end only and advancing said spindle laterally of its axis to advance a portion intermediate its ends successively toward said gang tools to be acted upon thereby while the spindle is rotating, and means for forcing resilient tubular stock onto said spindle.

2. In a machine for making grommets, a gang tool for providing a plurality of recesses in the work, a second gang tool for severing the work in a plurality of locations, a spindle for receiving thereon and supporting the work in the form of tubular stock, means for rotating the spindle and means for supporting the spindle at one end only and advancing said spindle laterally of its axis to advance a portion intermediate its ends successively toward said gang tools to be acted upon thereby while the spindle is rotating, and means for expanding the tubular stock as it is positioned on said spindle.

3. In a machine for making grommets, a gang tool for providing a plurality of recesses in the work, a second gang tool for severing the work in a plurality of locations, a spindle for receiving thereon and supporting the work in the form of tubular stock, means for rotating the spindle and means for supporting the spindle at one end only and advancing said spindle laterally of its axis to advance a portion intermediate its ends successively toward said gang tools to be acted upon thereby while the spindle is rotating, and means for stripping the tubular stock from said spindle after cut.

4. In a machine for making grommets, a gang tool for providing a plurality of recesses in the work, a second gang tool for severing the work in a plurality of locations, a spindle for receiving thereon and supporting the work in the form of tubular stock, means for rotating the spindle and means for supporting the spindle at one end only and advancing said spindle laterally of its axis to advance a portion intermediate its ends successively toward said gang tools to be acted upon thereby while the spindle is rotating, and means for forcing resilient stock onto said spindle, ironing the tubular stock after positioning on said spindle, and stripping the tubular stock from said spindle after cut.

5. In a machine for making grommets, a gang tool for providing a plurality of recesses in the work, a second gang tool for severing the work in a plurality of locations, a spindle for receiving thereon and supporting the work in the form of tubular stock, means for rotating the spindle and means for supporting the spindle at one end only and advancing said spindle laterally of its axis to advance a portion intermediate its ends successively toward said gang tools to be acted upon thereby while the spindle is rotating, a magazine for the tubular stock, and means feeding said stock into position for insertion onto said spindle, and means for forcing resilient stock onto said spindle.

6. In a machine for making grommets, a gang tool for providing a plurality of recesses in the work, a second gang tool for severing the work in a plurality of locations, a turret provided with a plurality of spindles supported at one end only for receiving thereon and supporting the work in the form of tubular stock, means for rotating said turret alternately and at relatively slow and high speeds, means for rotating each of the spindles in the turret, and means for advancing the spindles laterally of their axes to advance a portion intermediate the ends of the spindles successively toward said gang tools to be acted upon thereby while the spindle carrying the work which is acted upon is rotating.

CARL G. HOCKETT.

References Cited in the file of this patent

UNITED STATES PATENTS

| Number | Name | Date |
| --- | --- | --- |
| 1,186,203 | Jeffery | June 6, 1916 |
| 1,188,850 | Smith | June 27, 1916 |
| 1,447,263 | Norton | Mar. 6, 1923 |
| 1,468,171 | Schreiber | Sept. 18, 1923 |
| 1,555,853 | Higgins | Oct. 6, 1925 |
| 2,363,448 | Siesel | Nov. 21, 1944 |
| 2,463,563 | Robinson | Nov. 21, 1944 |
| 2,432,765 | Keller et al. | Dec. 16, 1947 |
| 2,475,091 | Hackman | July 5, 1949 |